United States Patent [19]

Nagano et al.

[11] Patent Number: 4,614,043

[45] Date of Patent: Sep. 30, 1986

[54] APPARATUS FOR DESIGNING A COUPLER

[75] Inventors: Ryuzo Nagano; Shinobu Arai, both of Osaka; Koji Matsui, Sennan, all of Japan

[73] Assignee: Osaka Shipbuilding Co., Ltd., Osaka, Japan

[21] Appl. No.: 743,998

[22] PCT Filed: Sep. 22, 1984

[86] PCT No.: PCT/JP84/00455

§ 371 Date: May 17, 1985

§ 102(e) Date: May 17, 1985

[87] PCT Pub. No.: WO85/01574

PCT Pub. Date: Apr. 11, 1985

[30] Foreign Application Priority Data

Sep. 30, 1983 [JP] Japan ................. 58-182446

[51] Int. Cl.⁴ ............................ G01B 5/00; G01B 5/24
[52] U.S. Cl. ..................................... 33/529; 33/180 R
[58] Field of Search ................. 33/180 R, 516, 529, 33/534, 562

[56] References Cited

U.S. PATENT DOCUMENTS

| | | | |
|---|---|---|---|
| 2,431,101 | 11/1947 | Woods | 33/529 |
| 2,563,599 | 8/1951 | Gardner | 33/529 |
| 3,270,426 | 9/1966 | Fischer et al. | 33/562 |
| 3,667,128 | 6/1972 | Morgan | 33/529 |
| 4,120,095 | 10/1978 | Lebourg | 33/529 |

FOREIGN PATENT DOCUMENTS

| 31763 | 3/1977 | Japan | 33/180 R |
|---|---|---|---|
| 81506 | 5/1984 | Japan | 33/562 |

Primary Examiner—Richard R. Stearns
Attorney, Agent, or Firm—Burgess, Ryan & Wayne

[57] ABSTRACT

A measuring apparatus for determining dimensional data for use in designing a coupler which is manufactured to be fitted between the free ends of already assembled pipes in a pipe system is disclosed. A first joint on which a first arm is slidably supported is pivotally connected to one end of a rod adapted for gauging the distance between the points of bend in the coupler to be manufactured. A first joint on which a second arm is slidably supported is itself slidably mounted on the rod for movement therealong. With this arrangement, measurement of the angle defined by relative rotation of the rod about its axis to the arms is limited to one point, that is, at either of the joints. In addition, this apparatus permits easy installation on the site of measurement. The relative movement between the rod and the second arm and that between each arm and its associated attachment plate for engaging to the respective free end, are automatically measured by an electrical detection device.

4 Claims, 6 Drawing Figures

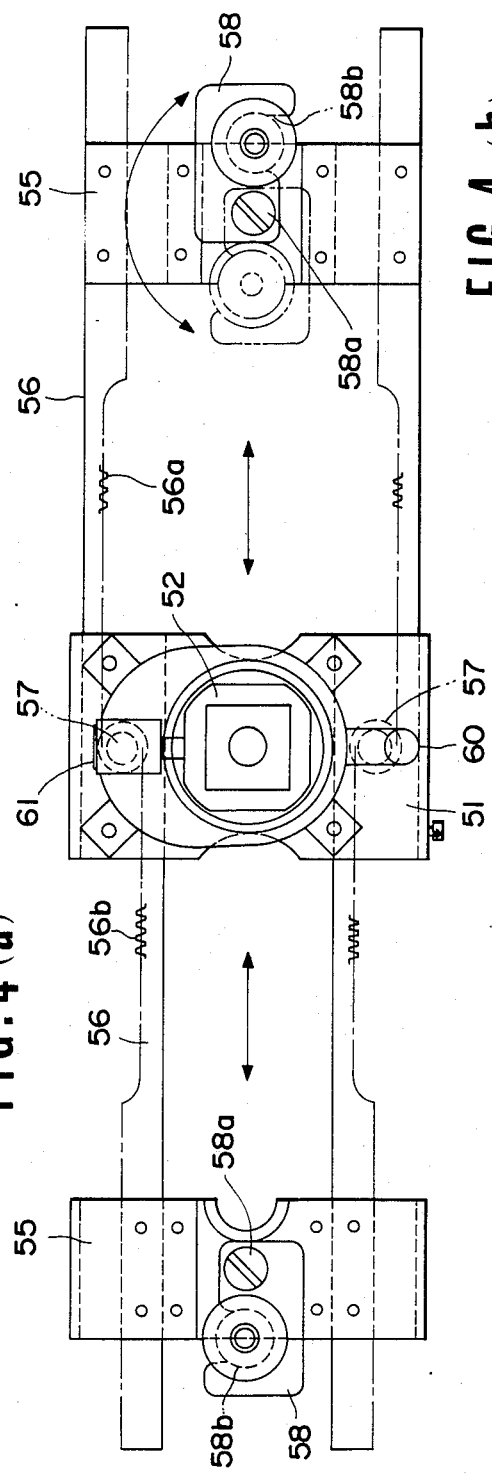
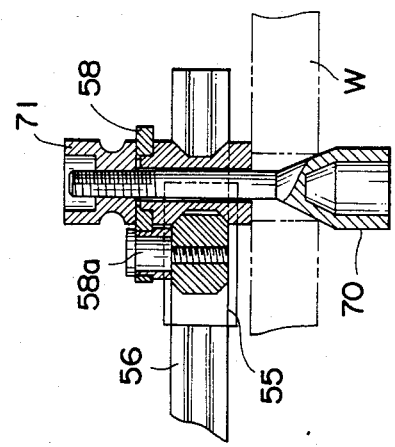
FIG. 4 (a)
FIG. 4 (b)

(C)

APPARATUS FOR DESIGNING A COUPLER

FIELD OF THE INVENTION

The present invention relates to a measuring apparatus for determining dimensional data for use in designing a coupler which is specially manufactured to be fitted between the free ends of already assembled pipes in pipe systems.

BACKGROUND OF THE ART

A piping system for vessels, marine structures, or land based plants may be assembled as a modular unit from individual components such as flange pipes, fittings, and instruments that are prefabricated in the foundry or pipe manufacturing factory. Alternatively, it may be constructed of integral structures on which system elements are pre-equipped. However, even if these prefabricated system elements or pre-equipped structures are themselves built within strict manufacturing tolerance, their actual assembly on the site does not always consummate a perfect fit as a whole. Where one-sided deviations from standard dimension concentrate locally, there occurs a misalignment between the ends of already assembled pipes so that use of a straight pipe or a standard elbow is impossible to interconnect the pipe ends. In traditional practice, a normally double-bent pipe or coupler is specially manufactured, based on actual measurements made between the free ends of already assembled pipes at the very side of constructing a pipe system. The pipe thus manufactured is fitted between those free ends.

To manufacture the coupler in a shape congruous enough to be precisely fitted in its place, a suitable measuring apparatus is required which is used to determine the length of coupler segments and the relative angle between them and determine its relative position to the flange bolts of each assembled pipe to obtain necessary dimensional data for designing its shape. There have been proposed many such devices.

The published Japanese Patent application No. 50-110964 discloses a typical apparatus of this kind. This apparatus consists of a graduated rod, a pair of graduated arms rotatably slidably mounted at their one end on the rod, and a pair of flange plates also rotatably slidably jointed to the opposite ends of the arms, respectively. In practice, the apparatus is held in suspended position between the free flanged ends of already incorporated flange pipes in which a specially manufactured coupler is to be connected, with the flange plates secured to the flanged end, respectively. The angular and positional relation of each flange plate to the associated arm is measured to determine the relative orientation of the coupler to each flanged end of the already assembled pipes and the distance between each point of bend and the plane of the corresponding flanged end. In addition, the angle defined by relative rotation of each arm to the rod is gauged to determine the relative orientation of the central portion to each bent end in the remodeled pipe. Moreover, the distance between the points at which the axis of the rod is intersected by the axes of the arms is measured to represent the length between the points of bend. Thus, with this conventional measuring apparatus, the measurer must take reading at a total of nine points for a single coupler to be manufactured.

However, these prior art measuring apparatus pose various problems. First, since their structural designs are such that the rod extends to stand in the way of the arm rotating beyond the point defined by the longitudinal axis of the rod (about 180° C.), some difficulty is encountered in handling and in properly framing the apparatus as required at the site of measurement. Secondly, since the measuring operation in itself requires human attendance directly at the very spot where the apparatus is installed, use at a high place or a restricted area or under poor lighting condition must expect considerable inconvenience, with a resultant high risk of making errors of reading. In addition, since the measurer has as many as nine points at which to take reading for a single coupler, as stated earlier, not only is enormous effort imposed on the measurer, but also complicated operations are involved in subsequent processing of measured data.

OBJECTS OF THE INVENTION

The present invention has been proposed to solve the above-mentioned problems. It is therefore an object of this invention to provide a measuring apparatus for determining the shape of a coupler which can be universally employed without limitations as to handling. Another object is to provide such an apparatus which is capable of automatic reading so that the measurer need not attend directly on the apparatus at the site of measurement. Still another object is to provide such an apparatus which permits the measurer to reduce the number of measuring items required to design a coupler to be manufactured.

SUMMARY OF THE INVENTION

To illustrate briefly, the apparatus for designing a coupler in accordance with the present invention consists of a rod member for measuring the distance between the points of bend in a coupler, a first joint pivotally mounted at one end of the rod member and having a first arm pivotally mounted thereon for measuring the angle defined by relative rotation to the rod of the first arm about the axis of the rod and about the axis perpendicular to that of the axis, and a second joint slidably mounted on the rod and having thereon a second arm pivotally mounted for measuring the angle defined by relative rotation of the second arm to the rod about the axis perpendicular to the axis of the rod. This design, on the one side, reduces measuring operations since the measurer need not measure the angle defined by relative rotation to the rod of the second arm about the axis of the rod. On the other hand, since one arm is made freely rotatable in all directions, the apparatus can be set up with increased ease.

Beside the above-mentioned features, the present invention offers other advantages. For example, each arm is slidable with respect to its associated joint. This enhances efficiency in measuring the distance between the point of bend in a coupler and the plane of the corresponding flanged pipe end to which the coupler is to be connected. In addition, each of the arms is provided with an engagement plate which is pivotable for easily engaging with the flange pipe end. Moreover, the arms, along with the engagement plates, are each provided with a means to electrically determine the relative movement of movable apparatus segments to one another, which enables an automatic reading of measurements that are used to design the shape of the coupler to be manufactured.

DESCRIPTION OF THE PREFERRED EMBODIMENT

The present invention will be described in detail in conjunction with the accompanying drawings.

Figure 1:
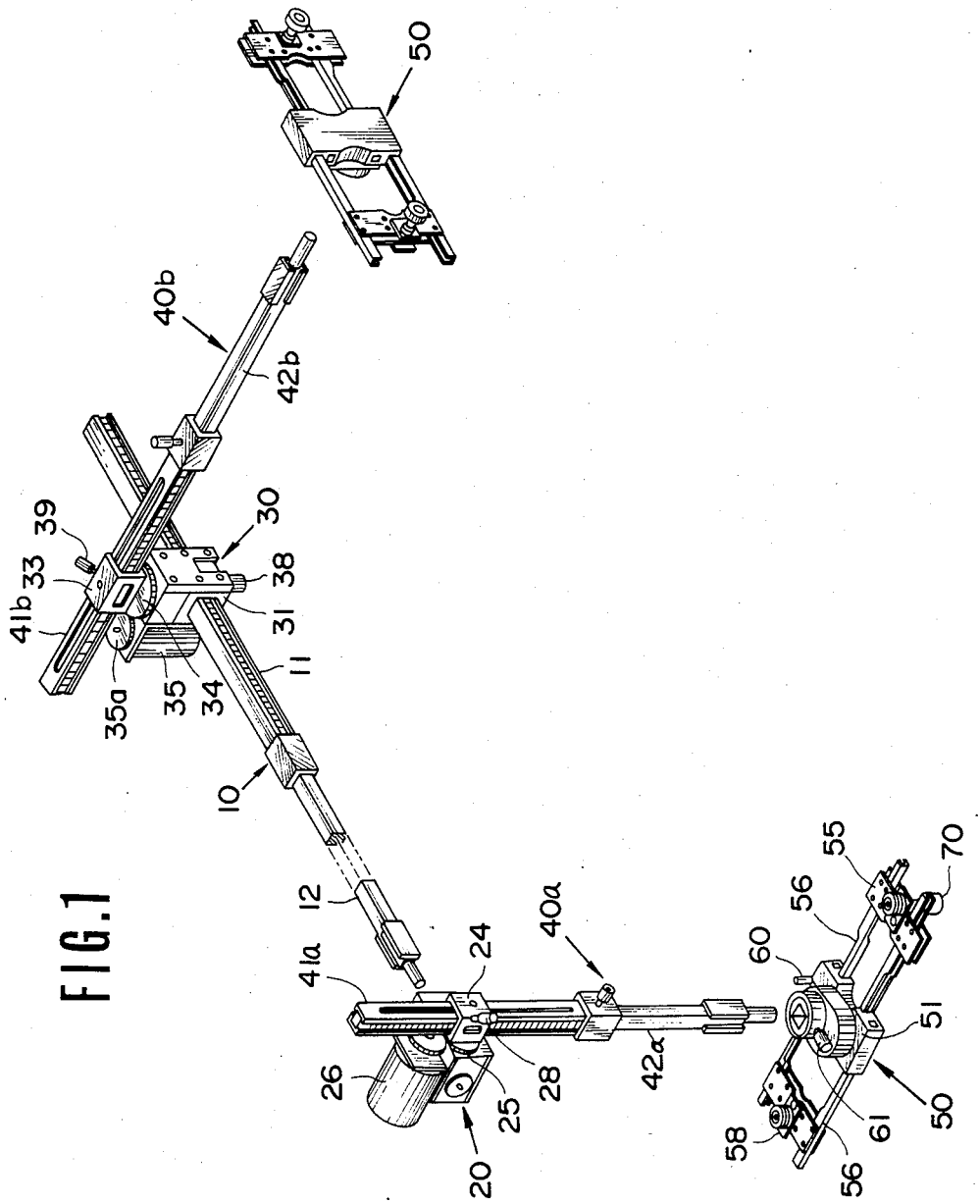
FIG. 1 is a perspective view of a preferred embodiment of the measuring apparatus constructed in accordance with the present invention.

FIG. 1 shows the overall construction of a preferred embodiment of the measuring apparatus according to this invention.

The measuring apparatus of this invention has a rod, largely designated at 10, which has a means for measuring the distance between the points of bend in coupler, as will be described later. To one end of this rod 10 is detachably pivotally connected a first joint 20 such that the joint 20 is pivotable about the axis of the rod 10 and has a means which detects the angle defined by relative movement of the joint 20 to the rod 10. A second joint 30 is slidably mounted on the opposite part of the rod 10 such that the joint 30 is set at any point on the rod relative to the first joint 20 and has a means which detects the angle defined by relative rotation of the joint 30 to the rod 10. A pair of first and second arms 40a and 40b are respectively connected to the joints 20 and 30 in such a manner that the arms 40a and 40b are slidable relative to their associated joint and have a means which detects the distance between the corresponding point of bend and the plane of the respective flanged end of the already assembled pipe. Also, a pair of engagement plates 50 and 50 are rotatably detachably connected to the opposite ends of the arms 40a and 40b, respectively, for engaging with the respective flanged pipe free ends.

Individual apparatus segments will be described in more detail. The rod 10 is composed of a main rod portion 11 of rectangular cross-section, on which the second joint 30 is slidably mounted, and an auxiliary rod portion 12 of rectangular cross-section coaxially connected to the main rod portion, on which the first joint 20 is pivotally mounted.

Figure 2:
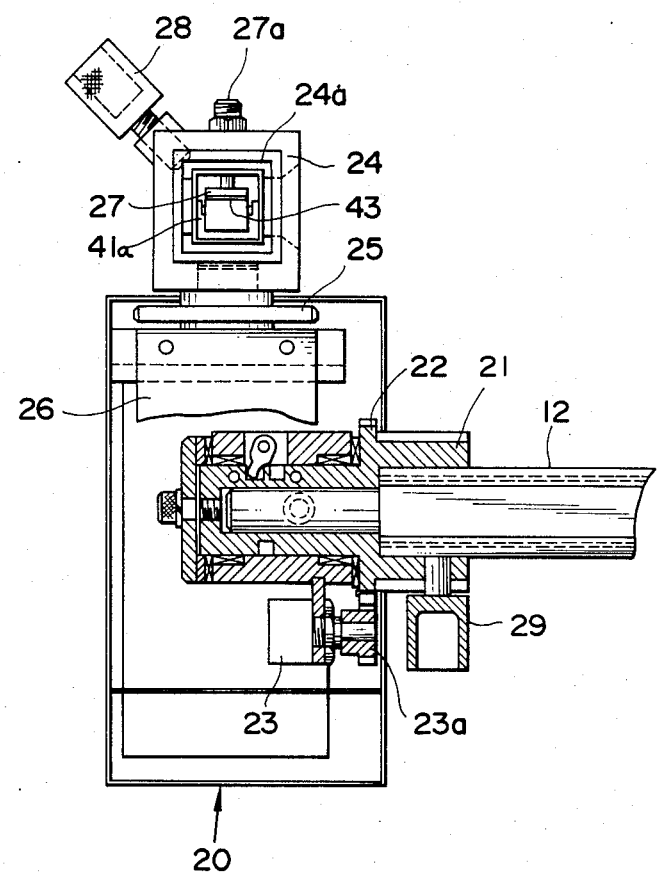
FIGS. 2 and 3 are respectively cross-sectional views of the first and second joints.

Referring to FIG. 2, the first joint 20 has therein a sleeve 21 that is pivotable on bearing means (not shown) into which the auxiliary rod portion 12 of the rod is detachably inserted at its end. A gear wheel 22 is made integral with the sleeve 21 for rotation therewith about the axis of the rod 10. A potentiometer 23 is mounted fixedly on the first joint 20 and has a pinion 23a operatively connected thereto. The gear wheel 22 is engaged in mesh with the pinion 23a such that the potentiometer 23 detects the angle defined by relative rotation to the rod 10 of the first joint 20 and hence the first arm 40a about the axis of the rod 10. On that side of the first joint 20 perpendicular to the side through which the auxiliary rod portion 12 is inserted, an arm guide 24 is pivotally mounted which has a rectangular guide hole 24a bored therethrough, in which the first arm 40a is slidably supported. The arm guide 24 pivots about the axis perpendicular to the longitudinal axis of the first arm 40a. A gear wheel 25 is made integral with the arm guide 24 for rotation therewith and engaged in mesh with a pinion (not shown), which is operatively connected with the potentiometer 26. It is so designed that the potentiometer 26 detects the angle formed by relative rotation to the rod of the first arm 40a about the axis perpendicular to that of the rod. The first arm is composed of a main arm portion 41a, which is inserted into the arm guide 24, and an auxiliary arm portion 42a. Also, means is provided to measure the distance between the point of bend, that is, the point at which rod is intersected by the first arm, and the plane of the flanged pipe end W. This is done by a linear potentiometer system having a length of resistance wire 43 extended in the main arm portion 41a and a brush 27, as a sliding contact, provided at the tip of an adjustment screw 27a that is provided in the arm guide 24. The distance is determined by gauging the voltage in the wire 43 when the brush 27 is brought into contact with the resistance wire 43 by turning in the adjustment screw at the point where the first arm is fixed to the arm guide 24. In FIG. 2, the numeral 28 indicates a screw for fixing the first arm 40a to the arm guide 24. Also, the numeral 29 designates a screw for securing the auxiliary rod portion 12 to the sleeve 21.

Figure 3:
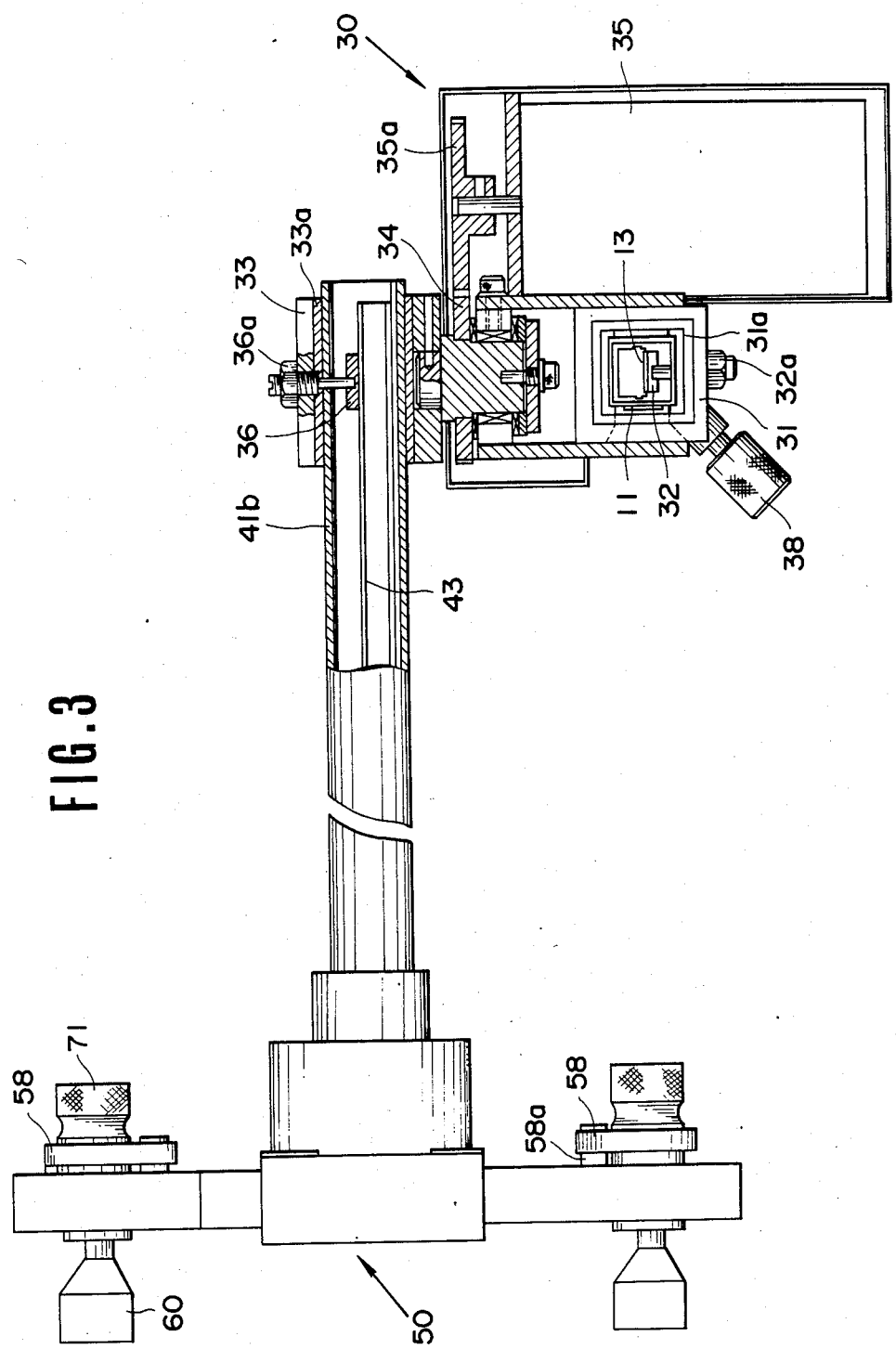

Referring now to FIG. 3, the second joint 30, in which the rod 10 is slidably supported, has a means which detects the angle formed by relative rotation to the rod 10 of the second arm 40b about the axis perpendicular to that of the rod 10 and a means which measures the distance between the points of bend, that is, the points at which the rod is intersected by the first and second arms. The second joint 30 is provided with a rod sleeve 31 having a rectangular hole 31a bored therethrough, in which the main rod portion 11 is slidably supported. The means for detecting the distance between the points of bend if a linear potentiometer system having a length of resistance wire 13 extended in the main rod portion 11 and a brush 32 as a sliding contact, provided at the tip of an adjustment screw 32a that is installed in the second joint 30. The distance is determined by gauging the voltage in the resistane wire 13 when the brush 32 is brought into contact with it by the adjustment screw 32a at the point where the second joint 30 is fixed to the rod 10. On the second joint 30 is also provided an arm guide 33 having a rectangular hole 33a bored therethrough in which the second arm 40b is slidably supported. The arm guide 33 is pivotably disposed to rotate about the axis perpendicular to that of the rod 10. A gear wheel 34 is made integral with the arm guide 33 for rotation therewith such that the second arm 40b is oscillated relative to the rod. A potentiometer 35 is secured on the second joint 30 and has a gear wheel 35a operatively connected thereto, which is engaged in mesh with the gear wheel 34. It is so designed that the potentiometer 35 detects the angle defined by relative rotation to the rod of the second arm 40b about the axis perpendicular to that of the rod 10. Also, the means designed to measure the distance between the point of bend, that is, the point at which the rod is intersected by the second arm 40b, and the plane of the flanged pipe end W, is connected to a linear potentiometer system having a length of resistance wire 43 extended in the main arm portion 41b and a brush 36, as a sliding contact, provided at the tip of an adjustment screw 36a that is installed in the arm guide 33. The distance is determined by gauging the voltage in the resistance wire 43 when the brush 36 is brought into contact with the wire 43 by turning in the adjustment screw 36a at the point where the second arm 40b is secured to the arm guide 33. In FIG. 3, the numeral 38 designates a screw for fixing the second joint 30 to the main rod portion 11. The numeral 39 indicates a screw for securing the second arm 40b to the arm guide 33.

Figure 4:
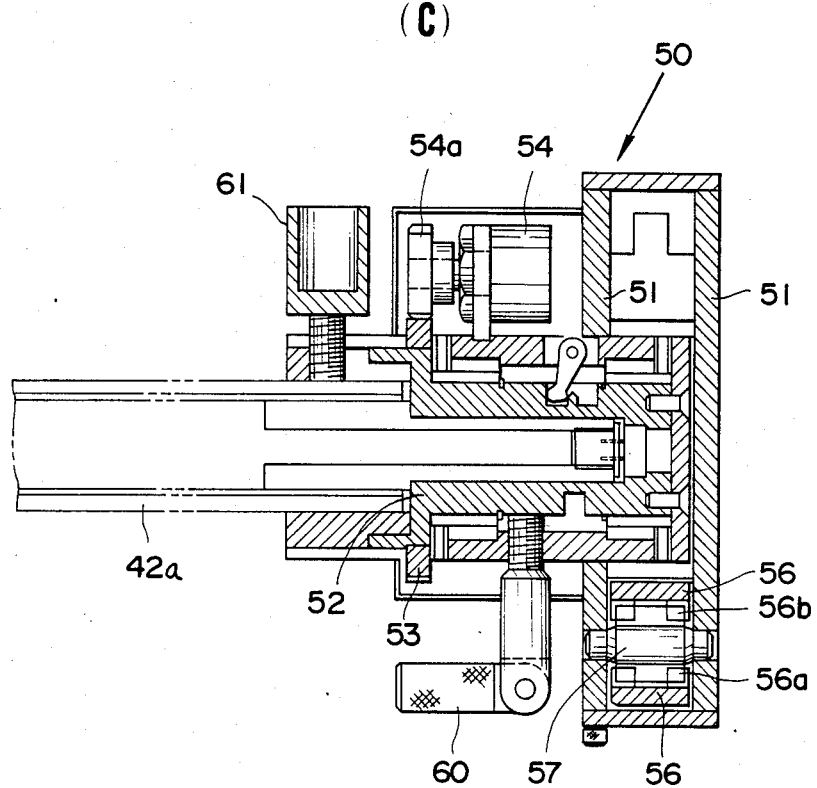
FIG. 4(a) is a plan view of the engagement plate.
FIGS. 4(b) and 4(c) are respectively cross-sectional views of its important parts.

Referring to FIGS. 4(a) through 4(c), an engagement member 50 is detachably connected to the opposite end of each auxiliary arm portion 42a, 42b for attaching to the respective flanged pipe end W. Both engagement members 50 and 50 are similar in construction and in the manner in which they are connected. Accordingly, description will be confined to that one which is coupled to the first arm 40a. The engagement member 50 is composed of a pair of guide plates 51 and 51 disposed in spaced-apart parallel relationship with each other. A sleeve 52 is pivotally disposed in the guide plates 51 and 51 for receiving therein the rectangular end of the auxiliary arm portion 42a. A gear wheel 53 is made integral with the sleeve 52 for rotation therewith such that the first arm 40a can be relatively pivoted to the engagement member. A potentiometer 54 is provided in the engagement member 50 and is operatively connected with the gear wheel 53 through a pinion 54a with which the gear wheel 53 is engaged in mesh. It is so designed that the potentiometer 54 detects the relative movement of the engagement member 50 to the first arm 40a as the former 50 is pivoted into proper alignment with the flanged pipe free end W. Thus, the positions of the bolt holes in the flanged end W are identified. A pair of rack frames 56 and 56 are slidably disposed in the spacing in the guide plates 51 and 51 in such a manner that they can move in opposite directions relative to each other. Each rack frame 56 is provided at its other end with a support plate 55 that holds the respective rack frame 56 in a rigid construction. As shown in FIG. 4(a), one of the rack frames (in this particular embodiment, the left-hand one in the drawing) is provided with teeth along its outside edge, largely indicated at 56b, while the other being cut with teeth along its inside edge largely designated at 56a. A pair of matching pinions 57 and 57 are provided in the guide plates and disposed to rotate in mesh with the rack frames, respectively. The arrangement is such that both racks move simultaneously in opposite directions and always for an exactly equal distance. The numeral 58 indicates a hook means which can be pivoted about a pivot 58a, as best shown in FIG. 4(a), that is fixed on the support plate 55. The hook means 58 has a hook portion 58b for securing the engagement plate 50 to the flanged pipe end W. This is done by engaging the hook means 58 about a bolt 70 inserted through the flanged end bolt hole and tightening a nut 71 to the bolt 70, as shown in FIG. 4(b). The numeral 60 indicates a screw for fixing the rack frames to the guide plates 51. Also, the numeral 61 designates a screw for fixing the auxiliary arm portion 42a to the engaging member 50.

The manner in which the measuring apparatus of this invention is set up at the site of measurement will be described in detail.

First, the engagement member 50, as it is not coupled to an arm, is held against the flanged pipe end W in a properly aligned manner. With the engagement member in this position, the rack frames 56 and 56 are pulled out from the guide plates 51 to a point where the hook means 58, swung about its pivot 58a, is engaged about a bolt 70 inserted through the flanged end bolt hole at either side of the engagement member 50. To each of the bolts 70, a nut 71 is applied and tightened so that the engagement member 50 is secured to the flanged end W through both rack frames 56 and 56. Of course, this operation is repeated with both engagement members 50 and 50.

Then, to the secured engagement members 50 and 50, the first and second arms 40a and 40b are respectively connected by inserting their auxiliary arm portions 42a into the respective sleeves 52. Then, the ends of the main arm portions 41a and 41b are respectively inserted into the arm guides 24 and 33 in the joints 20 and 30. Finally, the rod 10 is assembled to complete the apparatus by inserting the auxiliary rod portion 12 into the sleeve 21 of the first joint 20 and the main rod portion 11 into the sleeve 31 in the second joint 30.

In the assembly of the measuring apparatus, as described above, the potentiometer 54 determines the positions of the flanged pipe free end bolt holes as the amount of rotation of the sleeves in both engagement members. Also, the distance between each point of bend and the plane of the respective flanged end W is detected by the linear potentiometer system as the magnitude of voltage in the corresponding wires 43 in the main arm portions 41a and 41b as they are contacted by their respective brushes 27 and 36 in the arm guides 24 and 33, respectively, at the point where each arm is fixed to the arm guide. Moreover, the angle defined by relative rotation to the rod of each arm 40a, 40b about the axis perpendicular to that of the rod, is detected by the potentiometers 26 and 35, respectively provided in the first and second joints 20 and 30. Furthermore, the angle formed by relative rotation to the rod of the first arm 40a about the axis of the rod, is detected by the potentiometer 23. In addition, the distance between the points of bend is detected by the linear potentiometer system as the magnitude of voltage in the resistance wire 13 in the main rod portion 11 as it is contacted by the brush 32 in the sleeve 31 at the point where the second joint 30 is fixed to the rod 10. These detected measurements are input as data signals into a data processing device which analyzes them to design the shape of a coupler which is specially manufactured to be fitted between the flanged pipe ends W.

INDUSTRIAL APPLICATION AND EFFECTS

It will be appreciated from the above that the measuring apparatus according to this invention is very suitable in cases where it is impossible to use straight couplers or standard elbows between the free ends of already assembled pipes owing to structural disalignment in vessel pipe networks or land based plants. This apparatus allows for design of a coupler to be connected between such disaligned pipe ends, based on fewer measurements than with conventional devices.

We claim:

1. A measuring apparatus for designing the shape of a coupler to be fitted between the flanged ends of already assembled pipes in a pipe system, comprising:
    a rod member for gauging the distance between points of bend in said coupler,
    a pair of first and second arms for gauging the distance between each of said points of bend and the corresponding flanged end,
    a first junction member having at least a first surface and a second surface whose plane is perpendicular with that of said first surface, coupling means pivotally connected in said first surface of said first junction member for coupling to one end of said rod such that said rod is pivotable about its axis, holding means pivotally connected in said second surface of said first junction member for holding therein said first arm such that said first arm is pivotable about an axis perpendicular with that of said rod and also slidable with respect to said first junction member, electrical detection means provided in said first junction member for electrically measuring the angle defined by relative rotation of said rod about its axis to said first arm, the angle defined by relative rotation to said rod of said first arm about the axis perpendicular with that of said rod, and the amount of linear movement of said first arm with respect to a reference point, a second junction member having at least a first and second surface opposite to each other, a first sleeve provided on said first surface which permits movement of said rod therethrough such that said second junction member can take any position along said rod with respect to said first arm, and a second sleeve pivotally connected to said second surface for holding said second arm therein such that said second arm is rotatable about an axis perpendicular to that of said rod and is also slidable with respect to said second junction member, electrical detection means provided in said second junction member for electrically measuring the distance between said first and second junction members along said rod, the angle defined by relative rotation of said second arm to said rod, and the amount of linear movement of said second arm with respect to a reference point, a pair of engagement plates for engaging with the respective flanged ends which are rotatably connected to the opposite ends of said first and second arms, respectively, and, electrical detection means provided in each of said engagement plates for measuring the angle defined by relative movement of each engagement plate about its associated arm.

2. An apparatus as set forth in claim 1, wherein said first junction member and said engagement plates are respectively detachably connected to said rod and said first and second arms.

3. An apparatus as set forth in claim 1, wherein the electrical detection means provided in each of said first and second junction members includes linear potentiometer means which detects the magnitude of voltage in a length of resistance wire provided in said rod and the respective one of said first and second arms to measure relative movement therebetween.

4. An apparatus as set forth in claim 1, wherein each of said engagement plates comprises a pair of rack and pinion arrangements, each arrangement including a rack portion, in which each rack portion is designed to move in an opposite direction with, respect to the other rack portion of the same engagement plate, a pair of common pinions in meshing engagement with both rack portions at one end of the rack portions, and engaging means provided at the opposite ends of said rack portions for individually engaging with the respective flanged ends of already assembled pipes through bolts inserted through said flanged pipe ends.

* * * * *